April 26, 1966 D. K. FOX ETAL 3,247,947
PASSENGER CONVEYORS

Filed July 2, 1963 3 Sheets-Sheet 1

WITNESSES:
John L. Chopp
James F. Young

INVENTORS
Donald K. Fox and
Charles L. Carlson
BY Reisman
ATTORNEY

April 26, 1966   D. K. FOX ETAL   3,247,947
PASSENGER CONVEYORS
Filed July 2, 1963   3 Sheets-Sheet 3

United States Patent Office 3,247,947
Patented Apr. 26, 1966

3,247,947
PASSENGER CONVEYORS
Donald K. Fox, Penn Hills, and Charles L. Carlson, Irwin, Pa., assignors to Westinghouse Electric Corporation, Pittsburgh, Pa., a corporation of Pennsylvania
Filed July 2, 1963, Ser. No. 292,365
6 Claims. (Cl. 198—16)

This invention relates to passenger conveyors and it has particular relation to the load carrying surface of a passenger conveyor comprising a segmented belt.

One type of passenger conveyor is a moving walk employing a moving belt for transporting passengers from a first to a second landing. The landings may be spaced both horizontally and vertically, and the belt may be articulated, e.g., constructed of an endless series of rigid and rectangular segments or platforms.

The belt platforms conveniently may be formed of lightweight metal. For example, an aluminum alloy having both high strength-to-weight ratio and inherently low density and which may be die cast in the proper configuration has been found to be quite desirable for this purpose.

In accordance with the invention, several methods and materials are disclosed for providing an improved passenger conveying surface. In a preferred embodiment of the invention, a passenger conveying treadboard is coated with a hard facing material by means of a flame spraying process to provide a wear and slip resistant finished surface. The process preferably is controlled so that the coating is heterogeneous, i.e., it comprises a plurality of layers of wear resistant particles, the outermost layer of which presents a relatively rough surface to load disposed thereon for inhibiting relative motion between the treadboard and a passenger carried thereby. This is particularly important if the passenger transporting run of the walk includes an inclined portion between its entrance and exit landings as where the landings are spaced both horizontally and vertically.

In another embodiment of the invention, a treadboard for conveying passengers is coated in a novel manner with materials having two different colors so that the color viewed by a prospective passenger depends upon his position with respect to the treadboard. As a result, the direction of travel of the treadboard may be readily ascertained. Preferably, the colored materials also impart wear and slip resistant characteristics to the load carrying surface of the treadboard.

It is, therefore, an object of the invention to provide an improved slip resistant passenger conveying surface.

It is a further object of the invention to provide an improved passenger conveying surface which is both slip and wear resistant.

It is an additional object of the invention to provide a passenger conveying treadboard whose surface color as seen by a prospective passenger depends upon the direction from which the treadboard is viewed.

It is also an object of the invention to provide a novel method for coating a metallic article and, more particularly, for furnishing an improved load bearing surface for a passenger conveying treadboard.

It is another object of the invention to provide an improved material for coating a metallic article and, more specifically, for coating a passenger conveying treadboard to provide an improved load bearing surface therefor.

Other objects of the invention will be apparent from the following discussion taken in conjunction with the accompanying drawings, in which.

Figure 1:
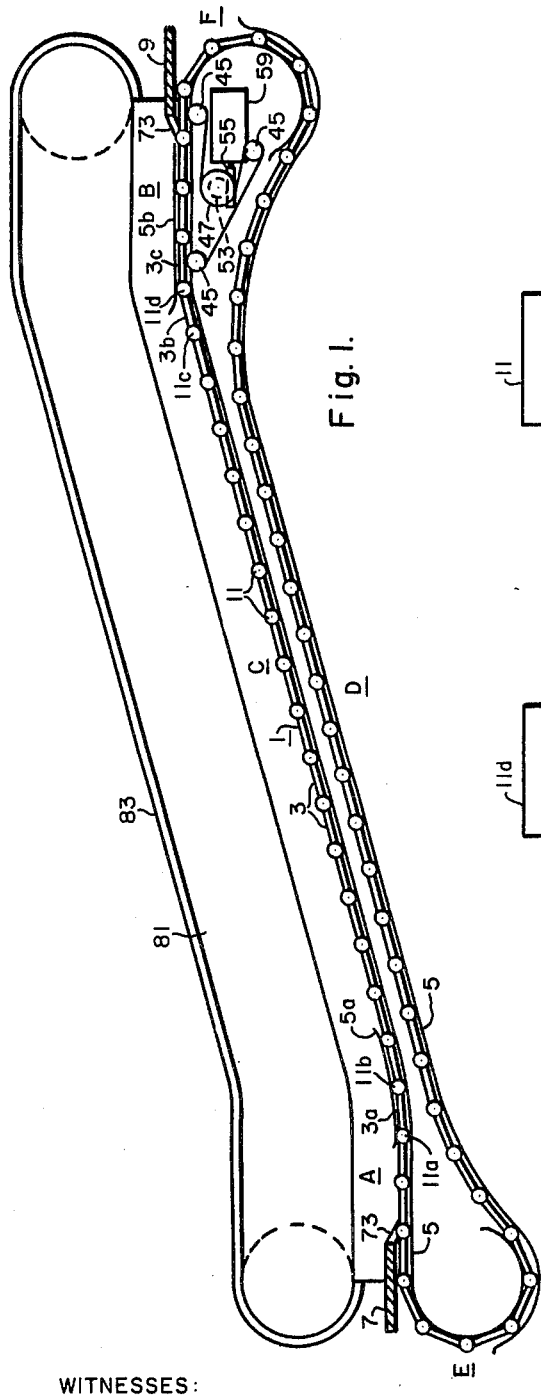
FIGURE 1 is a view in side elevation, with parts broken away, parts in section and parts omitted, of a moving walk embodying the invention.

Referring to the drawings, FIG. 1 illustrates a moving walk which includes a continuous articulated belt 1 comprising an endless series of substantially identical, generally rectangular, rigid pallets or platforms 3 disposed to be moved along guides or tracks 5, which may be supported by a suitable truss (not shown). The belt 1 has an upper or passenger transporting run extending between a lower landing 7 and an upper landing 9. The passenger or load transporting run comprises a lower horizontal portion A adjacent the lower landing 7, an upper horizontal portion B adjacent the upper landing 9 and a portion C which joins the horizontal portions and which may be inclined at an angle relative to the horizontal of the order of 15 degrees. The belt 1 also has a lower or return run D and a pair of arcuate end runs E and F, the latter of which constitute transitions between the passenger transporting and return runs.

Adjacent ones of the platforms 3 are supported in common by a pair of outwardly disposed wheels or rollers 11, which are mounted for rotation about a common axis by means of a pair of longitudinally aligned stub axles 13, respectively. The rollers 11, in turn, are supported by the tracks 5 for guiding the platforms 3 in the desired path.

Figure 3:
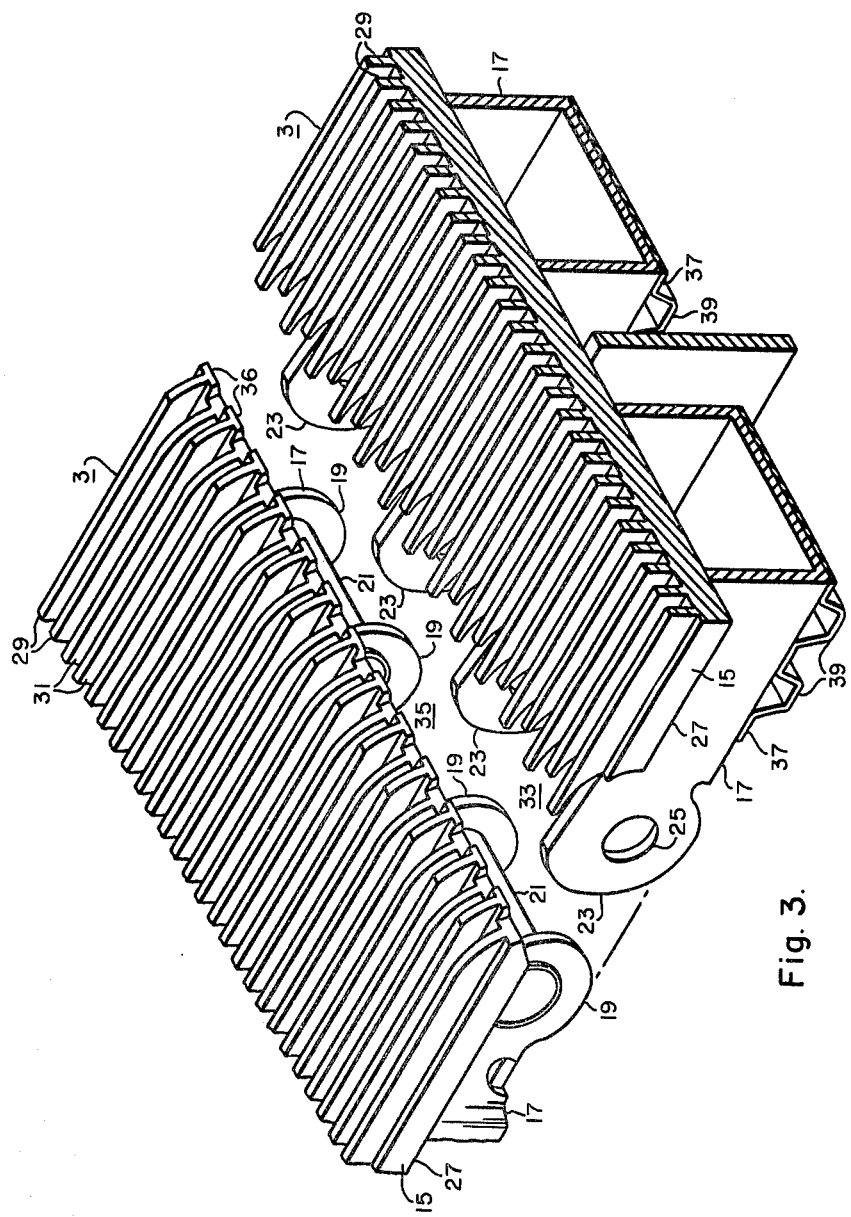
FIG. 3 is an enlarged isometric view, with parts in section, illustrating details of construction of the platforms of the moving walk of FIG. 1.

Turning to FIG. 3 each platform includes a treadboard 15 and a pair of spaced platform and roller support links 17, a separate one of which is disposed adjacent each side of the treadboard. The corresponding links of each treadboard are aligned longitudinally with each other. Preferably, the treadboards and links are fabricated of metal. For example, desirably the treadboards may be formed of a material which can be die-cast to the desired shape. The material may be aluminum or an aluminum-containing material such as a die-casting alloy. The links 17 may be constructed of sheet steel and may be secured to the treadboards 15 by any suitable means such as bolting or welding.

Each of the links 17 has a generally channel or U-shaped configuration. The end portions of the links form supports for the roller axles 13. Thus, at one end of each link is a pair of spaced end portions 19. Associated with each of these pairs of end portions is a suitable bushing or bearing 21 which is inserted through respective apertures in the end portions to bridge the space therebetween. The bushings may be secured to the links as by means of welding. Each end of each bushing 21 projects slightly beyond the outer face of the adjacent link end portion 19.

At the opposite end of each support link 17 is a pair of end portions 23, each having an aperture 25. The end portions 23 of each link are spaced by a distance which is somewhat greater than the spacing between the opposite end portions 19, so that the former may overlap the latter. Preferably, the spacing between the end portions 23 of each link is substantially equal to the length of each of the bushings 21.

For assembling each of the rollers 11 to a pair of adjacent platforms 3, the apertures in the associated support link end portions 23 of one of such platforms are aligned with the aperture in the bushing 21 secured to the end portions 19 of the corresponding support link of the other of such platforms. The roller axle 13 then is inserted through the aligned apertures, and split retaining rings (not shown) may be applied to the axle adjacent the outer face of each link end portions 23. For this purpose, the axle may have two peripheral grooves (not shown) into which the retaining rings may be inserted. Preferably, at least one of the end portions 23 is keyed to the axle 13 in a conventional manner. The bushing 21 has a slightly larger inside diameter than the outside diameter of the axle 13. Thus, adjacent platforms are rotatable relative to each other about the axis of rotation of the associated pair of rollers 11.

It will be appreciated that the foregoing association of the platforms 3, the axles 13 and the rollers 11 permits the platforms to follow precisely the desired course as determined by the tracks 5. In order to prevent the rollers and their respective associated platforms from rising from the tracks 5 during transition of the belt 1 between its load transporting run lower horizontal portion A and its inclined portion C, a relatively short auxiliary upper track section 5A (FIG. 1) is provided at each side of the belt adjacent the aforesaid transition for engaging the upper portions of the rollers as they pass thereunder.

The treadboard 15 of each platform 3 includes a body or base portion 27 which carries a plurality of parallel cleats 29 spaced to form grooves 31 therebetween extending in the direction of movement of the platform. The cleats and grooves of each of the platforms are aligned longitudinally with the cleats and grooves of each of the other platforms. Preferably, the cleats 29 extend to a uniform height from the bodies 27.

The dimensions of the treadboard cleats and grooves preferably are such that loads to be transported by the belt 1 will be supported adequately by the cleats on the top surfaces thereof. For example, each of the cleats 29 may have a width of the order of ⅛ inch, while each of the grooves 31 may have a width of the order of ¼ inch, the cleat pitch, therefore, being of the order of ⅜ inch.

The opposite end portions of each platform treadboard 15 are configured so that one end portion of each treadboard closely overlaps the adjacent end portion of the adjacent treadboard, as viewed from above, during travel of the platforms 3 throughout the passenger transporting run of the belt 1 between the landings 7 and 9. For this purpose, the treadboard of each platform has opposite generally cylindrical end portions, i.e., each treadboard has a generally concave end portion 33 and an opposite generally convex end portion 35, each of which extends from side to side of the associated treadboard.

It will be observed that the ends of the treadboard cleats 29 are staggered and that each end of each treadboard base 27 comprises teeth 36 spaced to form notches therebetween. The cleat ends and the base teeth and notches are curved in a manner such that each cleat end merges smoothly into its associated base tooth or notch, as the case may be.

Preferably, the axis of curvature of the cleat ends and the base teeth and notches of each treadboard end portion is coincident with the axis of rotation of that pair of rollers 11 associated with such end portion. The roller tracks 5 are configured and the treadboard cleat ends and base teeth are dimensioned so that adjacent cleat ends and base teeth of adjacent treadboards intermesh during travel of the platforms 3 throughout the passenger transporting run of the belt 1 between the landings 7 and 9. The clearance between adjacent treadboard concave and convex end portions 33 and 35 may be held to a minimum consistent with practical design considerations, being sufficient to prevent interference between adjacent treadboards over the entire path of travel of the platforms.

Let it be assumed that the platforms 3 are moving in a generally clockwise direction, as viewed in FIG. 1, in order to convey passengers from the lower landing 7 to the upper landing 9. During transition of the platform 3a from the load transporting run lower horizontal portion A to the inclined portion C, the platform rotates in a counterclockwise direction about the axis of rotation of the rollers 11a, at the same time rotating in a clockwise direction about the axis of rotation of the rollers 11b. Similarly, during transition of the platform 3b from the inclined portion C to the upper horizontal portion B, such platform rotates in a counterclockwise direction about the axis of rotation of the rollers 11c and in a clockwise direction about the axis of rotation of the rollers 11d. It will be apparent that corresponding rotations occur when the platforms move in the opposite direction to convey passengers from the upper landing 9 to the lower landing 7.

Figure 2:
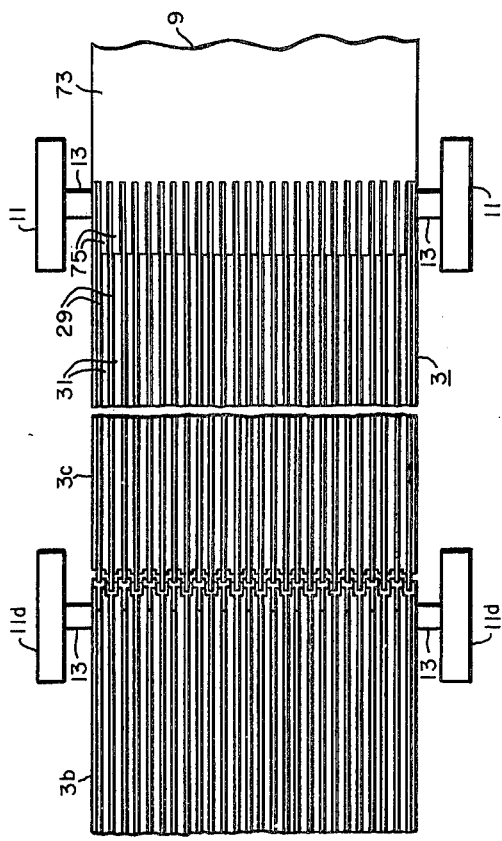
FIG. 2 is a top plan view of a portion of the moving walk illustrated in FIG. 1.

As a result of the curvature of each of the treadboard end portions 33 and 35 and the overlapping of each of the convex end portions 35 by the adjacent concave end portion 33, it will be observed that a constant minimum gap is maintained between adjacent platforms during travel thereof throughout the load transporting run of the belt 1, and more particularly during transition of the platforms between each of the horizontal portions A and B and the inclined portion C. Such overlap together with the accompanying meshing of the treadboard cleats and base teeth substantially eliminates the possibility of insertion of objects between adjacent platforms. In the absence thereof, however, it will be appreciated that an objectionable gap of substantial and varying proportions would exist between adjacent platforms. (In the top plan view of FIG. 2, the spacings between the treadboard cleats and the base teeth of the platform 3b and the respective corresponding parts of the platform 3c are exaggerated for the purpose of clarity.)

For driving the platforms 3, a rack 37 fabricated of metal such as steel, comprising a substantial number of teeth and being of substantial length relative to its associated treadboard is secured by any suitable means, as by bolting or welding, to the bottom of each of the support links 17, as viewed in FIG. 3. Each of the teeth 30 conveniently may extend from said to side of the associated support link.

Referring to FIG. 1, disposed within the loop of the belt 1 at the upper end thereof is a pair of continuous, flexible spaced drive belts 41 each having teeth (not shown) on its outer surface which are configured to intermesh with the teeth 39 of the racks 37. Preferably, the belts 41 are fabricated of a resilient material, for example, an elastomer such as rubber, which conveniently may be reinforced in a conventional manner with steel strands. It will be noted that the orientation of the belts 41 results in forces exerted by the belts on the racks 37 and thus on the platforms 3 having components acting not only in the direction of movement of the platforms, as desired, but also relatively smaller components acting vertically upward. In order to prevent the rollers 11 and their respective associated platforms from rising from the tracks 5 as a result of the latter forces, an auxiliary upper track section 5b is provided at each side of the belt 1 adjacent the toothed drive belts 41 for engaging the upper portions of the rollers 11 as the platforms pass over the drive belts.

Each of the drive belts 41 is trained around three idler pulleys 45 and a metallic gear 47. Each of the pulleys 45 is suitably mounted for rotation about its axis, while the gears 47 are secured to a common shaft (not shown) for rotation about a common axis. Such shaft may be supported by the moving walk truss. Each of the gears 47 has circumferential teeth (not shown), which are adapted to intermesh with the teeth of the associated drive belt 41. For each of the belts, the associated pulleys 45 and gear 47 are spaced to maintain the belt in an extended condition; and the upper two of such pulleys, as viewed in FIG. 1 are spaced sufficiently to permit the teeth of the belt to intermesh with the teeth 39 of a plurality of the racks 37, such as three racks.

The toothed belt driving gears 47 are rotated by means of a worm wheel 53 secured to their common shaft for rotation therewith. The wheel 53, in turn is driven by a worm 55 secured to the output shaft of a motor 59. The motor may be connected for energization by a suitable three-phase source of electric power (not shown) thereby effecting movement of the toothed belts 41 to drive the moving walk platforms 3 in the desired path. Between the source of power and the motor 59 may be connected a conventional control unit (not shown) which has an Up push button for effecting movement of the platforms 3 in a generally clockwise direction, as viewed in FIG. 1 a Down push button for causing the platforms to move in a generally counterclockwise direction and a Stop push button for terminating movement of the platforms.

At each of the landings 7 and 9 is disposed a comb or comb plate 73 (FIGS. 1 and 2) of conventional construction. Each of the comb plates 73 has a plurality of tapered fingers or teeth 75 which are received in the platform grooves 31 to intermesh with the cleats 29 thereof. Desirably, each of the comb plate teeth 75 is tapered to rise from a position wholly within its associated platform groove 31 to a position above the platform cleats 29.

Let it be assumed that the motor 59 is energized so that the belt 1 moves in a direction to transport load from the lower landing 7 to the upper landing 9 and that a passenger is disposed on one of the platforms 3 and is, therefore, being transported toward the landing 9. When the passenger, moving horizontally, arrives at the landing 9, he will be transferred smoothly thereto, as his feet contact the comb plate teeth 75 and the belt continues to move, due to the combing action of the comb plate teeth with the platform cleats 29 on which the passenger is disposed. Thus, the passenger is deposited on the landing 9 to a position clear of the belt, although he has not actually stepped from the belt onto the landing. If the direction of belt travel is reversed, i.e., if the motor 59 is energized so that the belt 1 moves in a direction to transport load from the upper landing 9 to the lower landing 7, operation of the platform cleats and comb plate teeth with respect to the smooth transfer of load from the belt 1 to the landing 7 is identical to the operation described above for the landing 9.

Referring to FIG. 1, a balustrade 81 may be disposed at each side of the load transporting run of the belt 1. Associated with each balustrade is an endless handrail 83, which is moved in synchronism with the platforms 3 in a manner well understood in the art.

For further details of construction of the moving walk illustrated herein, reference may be made to the Rissler et al. application Serial No. 200,499, filed June 6, 1962, and assigned to the same assignee as the present application. The Rissler et al. application has issued as Patent 3,191,743 on June 29, 1965.

Figure 4:
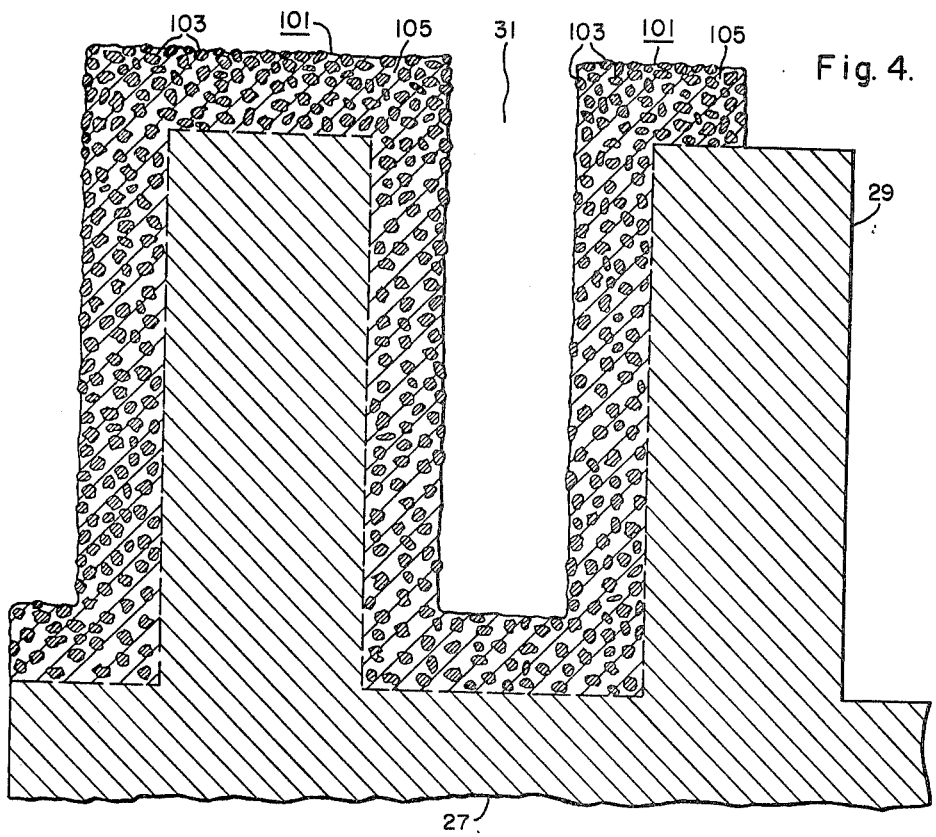
FIG. 4 is an enlarged fragmentary cross-sectional view in schematic form of one of the platforms of the moving walk of FIG. 1 illustrating one embodiment of the invention.

Turning now to FIG. 4, the respective dimensions of the components thereof have been exaggerated for the purpose of clarity. As is shown therein, each of the treadboard cleats 29 has an outer coating 101. Preferably, the coating 101 extends the entire length of each cleat, including its convexly curved end portion 35 (FIG. 3), and wholly covers its terminating base tooth 36 or notch, as the case may be.

The coating 101 preferably includes a plurality of layers of particles 103, the outermost layer of which presents a relatively rough slip-resistant surface to load disposed thereon. Desirably, the particles 103 also are wear and abrasion resistant.

The coating 101 conveniently may be applied by means of conventional flame spraying (metal spraying) equipment. For example, any one or a combination of several hard-facing materials such as molydenum, tungsten, nickel and cobalt, as well as alloys thereof, may be successfully and economically applied by such apparatus to form the coating. More particularly, a treadboard die cast from an aluminum alloy may be coated by means of a flame spraying process with 2 to 5 mils of stainless steel initially in powder form and having the following composition by weight: nickel, 4–6%; carbon, 0.15%; manganese, 8.5%; silicon, 1%; phosphorus, 0.06%; sulfur 0.03%; chromium, 17–19%; and the remainder iron.

In the flame spraying application of such a material, the particles comprising the powder are heated to a sufficiently high temperature to melt the outer portions or shells thereof, but insufficient to melt the particles completely. The heated material then is sprayed on the surface and allowed to cool to form a heterogeneous coating comprising in effect a cast structure 105 derived from the molten portions surrounding the particles 103, which have a structure derived from the non-molten portions which may be of a wrought nature. It will be noted that such wear of the coating as does occur to decrease its thickness over long periods of use results in the exposure of successive underlying layers of the coating such that the outer surface of the coating remaining under such conditions retains its slip, wear and abrasion-resistant characteristics.

Although the side and bottom surfaces of the treadboard grooves 31 may be masked to prevent depositing of the coating 101 thereon, it has been found that this is unnecessary, particularly in view of the relatively low thickness of coating which is required to achieve the desired characteristics. The absence of such masking also results in a lower cost of treadboard production.

In order to obtain a better mechanical bond between the coating and the metal on which it is deposited and thus to minimize the possibility of the peeling off of the coating, the uncoated surfaces of the treadboard cleats and grooves first may be cleaned and roughened by a conventional grit or shot-blasting method.

The particles 103 also may comprise any one or a combination of abrasive and wear resistant ceramic materials such as tungsten carbide and the oxides of aluminum, zirconium and beryllium. A preferred method of applying these materials is to form a mixture in powder form thereof and of a high temperature brazing alloy which may have the following composition by weight: nickel, 65–75%; chromium, 13–20%; boron, 2.75–4.75%; and a maximum of 10% total of iron, silicon and carbon.

The foregoing mixture may contain by volume from 10% to about 75% of the brazing alloy, the remainder of the mixture being the desired ceramic material. The powdered mixture may be applied by a high temperature flame spraying process, as by a plasma jet, to coat the treadboard cleats and grooves. In such a process, the temperature is sufficiently high to melt the brazing alloy, but sufficiently low to prevent the thorough melting of the ceramic particles. Application of the mixture in this manner results in the establishment of an extremely strong mechanical and metallurgical bond both between the brazing alloy and the material on which it is deposited and between the brazing alloy and the ceramic particles.

The coating 101 may be applied to the treadboards of a moving walk whose passenger transporting run extends between landings which are spaced only horizontally. However, the provision of the slip or skid resistant surface afforded by the coating 101 is even more desirable in a moving walk installation serving landings which are spaced both horizontally and vertically and whose passenger transporting run as a result has an inclined portion between the landings. It will be appreciated that the greater the angle of inclination, the greater the desirability of such a surface. It has been found, for example, that with the coating 101, an angle of inclination of 15° relative to the horizontal is quite practicable for the inclined portion C (FIG. 1). Without the coating 101, on the other hand, it would be desirable for this angle to have an upper limit of the order of 11°.

Although the coating may be applied to the comb plates 73, preferably the comb plates are left uncoated. If an abrasive coating is employed on the pallets this coating tends to provide a "self-machining" operation which maintains proper clearance between the pallets and the comb plates.

Another advantage resulting from the use of the coating 101 relates to the curved end portions 33 and 35 (FIG. 3) of the treadboards. As pointed out heretofore, the spacing between each treadboard convexly curved end portion 35 and the adjacent treadboard overlapping concavely curved end portion 33 desirably is held to a minimum. It is possible, however, that these adjacent end portions might tend to contact and interefere with each other in the event of malfunction, misalignment or wear of parts, but this tendency would be minimized by the application of a coating of the type described to each of the convexly curved end portions 35, since the coating may be designed to provide a good bearing surface. It may, if desired be designed to abrade away any surface with which it came into contact and thus to maintain the desired spacing therebetween. This is true regardless of the material of which the treadboards are constructed, but it is of special consideration if the treadboards are formed of a material such as aluminum or an aluminum alloy, inasmuch as interefering treadboard surfaces in the absence of the coating 101 then would tend to gall and to stick, bind, seize, or weld to each other when rubbed together as a result of relative rotation thereof during travel of the treadboards in the path defined by the moving walk tracks.

Figure 5:
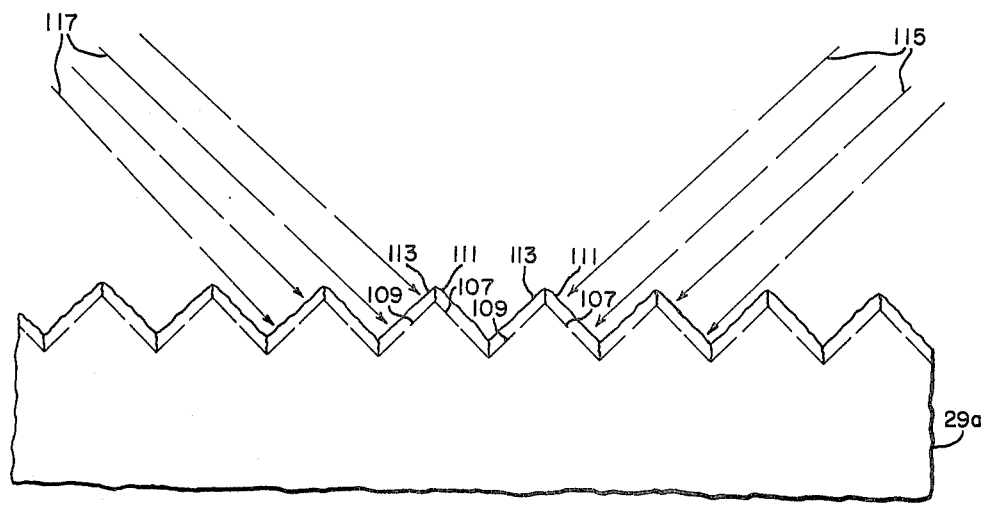
FIG. 5 is an enlarged fragmentary view in side elevation of a platform cleat illustrating another embodiment of the invention.

FIG. 5 illustrates an embodiment of the invention in which the outer portions of each treadboard cleat 29a comprises a plurality of parallel corrugations extending thereacross in a direction transverse to the direction of treadboard movement. Each corrugation thus has one face 107 directed toward one of the moving walk landings and another face 109 directed toward the other landing. Each of the faces 107 is provided with a coating 111, and each of the faces 109 has a coating 113. All of the coatings 111 have the same color, while all of the coatings 113 also are of the same color, but the color of the coatings 113 is different from that of the coatings 111.

Desirably, each of the coatings 111 and 113 also has the slip, abrasion and wear resistant characteristics discussed above. To this end, each of the corrugation faces 107 may be coated with a suitable material having one color by means of a flame spraying process from a direction generally indicated by the broken arrows 115, and each of the faces 109 may be similarly coated with a suitable material having another color from a direction generally designated by the arrows 117. For example, a mixture such as that described heretofore and comprising a high temperature brazing alloy material and ruby in powder form and in specified proportions may be applied by a plasma jet to form each of the coatings 111, the ruby particles imparting a reddish color to such coatings. Sapphire may be substituted for ruby in the mixture to impart a bluish or greenish-blue color to each of the coatings 113. As is well known, both ruby and sapphire basically are aluminum oxide.

Although the cleat corrugations in FIG. 5 are triangular in shape, each having an apex angle of 90°, other shapes and/or angles may be employed if desired. For example, the corrugations may be slightly rounded or flattened. Again, it will be apparent that the relative dimensions in FIG. 5 are exaggerated for the purpose of clarity.

It will be appreciated that as a result of the coating of the treadboard cleats in the manner just described, the treadboards may be assembled to form a moving walk belt such that one color, e.g., red, is predominantly viewed by a prospective passenger disposed at one landing of the moving walk, while another color such as blue, is predominantly viewed by a prospective passenger located at the other landing of the walk, the color viewed indicating whether or not the treadboards during their load transporting run are moving away from or toward the prospective passenger. Moving walks often are supplied in pairs, each walk generally being operated to move in a direction opposite to the other. Passengers sometimes inadvertently will step onto the moving belt expecting to be transported in a direction opposite to that which they intended. In order to minimize the possibility of such an occurrence, the treadboards may be oriented so that if they appear to a prospective passenger to be colored blue, for example, he will know that he may be transported by the associated walk away from the landing at which he is located, whereas if the treadboards appear to be colored red, the prospective passenger will known that the walk is being operated in the opposite direction and that he must take another moving walk in order to reach the destination he desires.

Moreover, if the prospective passenger sees the surface as made of alternate stripes of different colors the direction of motion of the walk is more readily apparent.

Although the invention has been described with reference to certain specific embodiments thereof, numerous modifications falling within the spirit and scope of the invention are possible.

We claim as our invention:

1. In a moving walk for transporting passengers, a structure having first and second spaced landings, a belt comprising an endless series of articulated similar treadboards and having a passenger transporting run inclined away from the horizontal and a return run, and means for moving said belt in a closed path with said passenger transporting run extending between said landings, each of said treadboards comprising a rigid base portion and having relatively low wear resistance and a wear resistant coating bonded to that surface of such base portion which is the upper surface thereof during said passenger transporting run, said coating presenting a rough surface to load disposed thereon for inhibiting relative motion therebetween, said coating retaining its surface roughness as its thickness decreases as a result of the wearing away thereof by load carried thereby.

2. In a moving walk for carrying load, a structure having first and second spaced landings, a belt having a load transporting run inclined relative to the horizontal and a return run, motive means for moving the belt in a closed path with said load transporting run extending between said landings, said belt comprising an endless series of articulated substantially identical rigid metallic platforms including first and second adjacent platforms having adjacent respective end portions extending between the sides of the associated platform, means mounting said first and second adjacent platforms for movement in said path and for independent rotation about a common horizontal axis extending transversely to the direction of movement of said belt, said end portion of said first platform being concavely curved about said axis, said end portion of said second platform being convexly curved about said axis, said curved end portion of said first platform overlapping in closely spaced relationship said adjacent curved end portion of said second platform throughout the movement of said first and second platforms between said landings on said load transporting run, each of said first and second platforms having a coating bonded to that surface thereof which is its inclined load transporting upper surface during said load transporting run including such upper surface of said convex end portion of said second platform, said coating comprising a plurality of layers of material having relatively high wear resistance, the outermost of said layers presenting a rough surface to load transported thereby for inhibiting relative motion therebetween, the outermost layer of the portion of said coating bonded to said convex end portion of said second platform also presenting a wear resistant surface to the overlapping surface of said concave end portion of said first platform.

3. In a moving walk for carrying passengers, a structure having a first landing and a second landing horizontally and vertically spaced from the first landing, a belt having a passenger transporting run and a return run, motive means for moving the belt in a predetermined closed path with said passenger transporting run extending between said landings, said passenger transporting run comprising a horizontal portion adjacent each of said landings, an inclined portion intermediate said horizontal portions and a separate transition portion joining each of said horizontal portions and said inclined portion, said belt comprising an endless series of articulated substantially identical rigid platforms including first and second adjacent platforms having adjacent respective first and second end portions extending between the sides of the associated platform, means common to said first and second adjacent platforms mounting such platforms adjacent said adjacent end portions for movement in said path and for rotation of said first platform relative to said adjacent second platform about a common horizontal axis extending transversely to the direction of movement of said belt during transition of said first and second platforms between each of said passenger transporting run horizontal portions and said passenger transporting run inclined portion, each of said platforms having a plurality of spaced cleats for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement above the adjacent cleats, each of said cleats of said first platform at said first end portion being concavely curved about said axis, each of said cleats of said second platform at said second end portion being convexly curved about said axis, said concavely curved cleat ends of said first platform overlapping in closely spaced relationship said convexly curved cleat ends of said second platform throughout movement of said first and second platforms between said landings on said passenger transporting run, the adjacent curved ends of alternate ones of the cleats of said first and second platforms being reciprocally staggered to intermesh throughout movement of said first and second platforms between said landings on said passenger transporting run, each of said cleats comprising an aluminum-containing base portion having a load-bearing surface of relatively low wear resistance and a heterogeneous coating deposited on and bonded to said surface of the base portion by means of a flame spraying process, said coating comprising a plurality of layers of nickel alloy particles having relatively high wear resistance, the outermost of said layers presenting a rough surface to load disposed thereon for inhibiting relative motion therebetween, the outermost layer of the portion of said coating bonded to each of the convexly curved cleat ends of said second platform also presenting a year resistant surface to the overlapping surface of the corresponding concavely curved cleat end of said second platform.

4. A moving walk treadboard for conveying load, said treadboard comprising a base portion and a plurality of spaced parallel metallic cleats secured to an extending longitudinally across said base portion, each of said cleats having an exposed upper surface, said exposed cleat surfaces being disposed substantially in a first plane to form a top tread surface for supporting load, a first end of each of said cleats being concavely curved about a first common axis adjacent thereto, the second end of each of said cleats opposite said first end being convexly curved about a second common axis adjacent thereto, said first and second axes being parallel and lying in a second plane parallel to said first plane and beneath said treadboard, the radius of curvature of said second end of each of said cleats being slightly less than the radius of curvature of said first end of such cleat, each of said cleats having a body portion and an upper tip portion, said tip portion comprising a plurality of layers of wear resistant particles and extending throughout the length of said body portion, the outermost of said layers forming said exposed upper cleat surface, such surface being rough for inhibiting relative motion between said treadboard and load disposed on said top tread surface.

5. In a moving walk conveyor for transporting passengers, a structure having first and second spaced landings, an articulated belt comprising an endless series of similar treadboards and having a passenger transporting run inclined relative to the horizontal and a return run, and means for moving said belt in a closed path with said passenger transporting run extending between said landings, each of said treadboards having a plurality of corrugations extending transversely to the direction of said corrugations from said first to said second landing, corrugations extending transversely to the direction of belt movement, each of said corrugations having a first face directed toward said first landing and a second face directed toward said second landing during said passenger transporting run, a first wear resistant coating bonded to said corrugation first face, and a second wear resistant coating bonded to said corrugation second face, each of said first coatings having a first color and each of said second coatings having a second color, whereby said first color is predominantly viewed by a prospective passenger disposed at said first landing and said second color is predominantly viewed by a prospective passenger disposed at said second landing.

6. In a moving walk for carrying passengers, a structure having a first landing and a second landing horizontally and vertically spaced from the first landing, a belt having a passenger transporting run and a return run, motive means for moving the belt in a predetermined closed path with said passenger transporting run extending between said landings, said passenger transporting run comprising a horizontal portion adjacent each of said landings, an inclined portion intermediate said horizontal portions and a separate transition portion joining each of said horizontal portions and said inclined portion, said belt comprising an endless series of articulated substantially identical rigid platforms, each of said platforms having a plurality of spaced cleats for transporting passengers supported by said cleats from said first landing to said second landing, said cleats extending in the direction of belt movement, the cleats of each platform being aligned with the cleats of each of the other platforms, and a comb plate disposed at said second landing, said comb plate having teeth adapted to intermesh with said cleats, each of said teeth having a tip located substantially completely in the space between a separate pair of adjacent ones of said cleats and having an exposed surface increasing in height from said tip to present an upper tooth surface gradually rising in the direction of belt movement above the adjacent cleats, the top portion of each of said cleats during said passenger transporting run comprising a plurality of horizontally disposed corrugations extending transversely to the direction of belt movement, each of said corrugations comprising a metallic base portion having relatively low wear resistance, said base portion having a first face directed toward said first landing and a second face directed toward said second landing during said passenger transporting run, a first coating bonded to said corrugation first face, a second coating bonded to said corrugation second face, each of said first and second coatings comprising a plurality of layers of wear resistant material, the outermost of said layers presenting rough surfaces to load disposed thereon for inhibiting relative motion between such load and said platforms, each of said first coatings having a first color and each of said second coatings having a second color, whereby said first color is predominantly viewed by a prospective passenger disposed at said first landing and said second color is predominantly viewed by a prospective passenger disposed at said second landing.

(References on following page)

References Cited by the Examiner

UNITED STATES PATENTS

| | | | |
|---|---|---|---|
| 1,956,153 | 4/1934 | Lindquist | 198—16 |
| 2,611,710 | 9/1952 | Woock | 106—1 |
| 2,905,308 | 9/1959 | Hansen | 198—16 |
| 2,912,345 | 11/1959 | Weiss | 117—37 |
| 2,938,806 | 5/1960 | Padula | 106—1 |
| 2,962,149 | 11/1960 | Hansen | 198—16 |
| 3,020,182 | 2/1962 | Daniels | 117—105 |
| 3,031,330 | 4/1962 | Hornick | 117—105 |
| 3,112,212 | 11/1963 | Holowaty | 117—37 |

SAMUEL F. COLEMAN, *Primary Examiner.*

WILLIAM B. LABORDE, RICHARD E. AEGERTER,
*Examiners.*